US010354405B2

(12) United States Patent
Lee

(10) Patent No.: US 10,354,405 B2
(45) Date of Patent: Jul. 16, 2019

(54) RUN-TIME CORRECTION OF DEFECT LOCATIONS DURING DEFECT REVIEW

(75) Inventor: Jeong Ho Lee, Palo Alto, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 1046 days.

(21) Appl. No.: 12/781,532

(22) Filed: May 17, 2010

(65) Prior Publication Data

US 2011/0280469 A1 Nov. 17, 2011

(51) Int. Cl.
G06T 7/73 (2017.01)
G06T 7/30 (2017.01)
G06T 3/00 (2006.01)

(52) U.S. Cl.
CPC ...... G06T 7/73 (2017.01); G06T 2207/10061 (2013.01); G06T 2207/30148 (2013.01); G06T 2207/30204 (2013.01)

(58) Field of Classification Search
CPC .............. G01N 23/225; H01J 2237/082; H01J 2237/202; H01J 2237/2806; H01J 2237/2817; H01J 37/20; H01J 37/222; H01J 37/244; H01J 37/28; H01J 2237/24564; H01J 2237/20228; H01J 2237/204; G06T 2207/30148; G06T 7/001; G06T 2207/20021; G06T 2207/30141; G06T 7/0004
See application file for complete search history.

(56) References Cited

U.S. PATENT DOCUMENTS 4,985,927 A * 1/1991 Norwood et al. ............ 382/149
6,172,363 B1 * 1/2001 Shinada ............... G01R 31/305
250/307
6,388,747 B2 * 5/2002 Nara ................... G03F 7/70616
356/394

(Continued)

FOREIGN PATENT DOCUMENTS

JP 06-252224 9/1994
JP 11-214462 8/1999

(Continued)

OTHER PUBLICATIONS

PCT International Search Report for Application No. PCT/US2011/029543, 5 sheets, dated Nov. 23, 2011 (Nov. 23, 2011).

(Continued)

Primary Examiner — Florian M Zeender
Assistant Examiner — Dana Amsdell
(74) Attorney, Agent, or Firm — Okamoto & Benedicto LLP

(57) ABSTRACT

One embodiment relates to a method for run-time correction of defect locations on a substrate during defect review. The substrate is loaded into a stage of a review apparatus, and coordinates for the defect locations on the substrate is received. The defect locations are grouped, and at least one local reference site in proximity to each group of defect locations is determined. The local reference site(s) is (are) used to determine a positional offset for the defect locations in each group. Another embodiment relates to an apparatus for reviewing defect locations on a substrate which provides (Continued)

for run-time correction of the defect locations. Other embodiments and features are also disclosed.

8 Claims, 4 Drawing Sheets

(56) References Cited

U.S. PATENT DOCUMENTS

| | | | |
|---|---|---|---|
| 6,407,373 | B1 | 6/2002 | Dotan |
| 6,453,992 | B1 | 6/2002 | Dotan |
| 6,426,501 | B1 | 7/2002 | Nakagawa |
| 6,476,388 | B1* | 11/2002 | Nakagaki ............ G01N 23/225 250/306 |
| 6,566,885 | B1* | 5/2003 | Pinto .................... G01N 21/66 324/501 |
| 7,103,505 | B2* | 9/2006 | Teshima ................ H01J 37/28 700/121 |
| 7,105,815 | B2* | 9/2006 | Obara .................. H01J 37/241 250/307 |
| 7,449,898 | B2* | 11/2008 | Honda ................ G01R 31/307 250/310 |
| 7,598,491 | B2* | 10/2009 | Fukunishi ............. H01J 37/28 250/310 |
| 7,601,954 | B2* | 10/2009 | Nishiyama .......... G01N 23/225 250/310 |
| 7,741,601 | B2* | 6/2010 | Noji .................... G01N 23/225 250/310 |
| 8,405,025 | B2* | 3/2013 | Honda .............. G01N 23/2251 250/306 |
| 2002/0130262 | A1* | 9/2002 | Nakasuji ............. G01N 23/225 250/311 |
| 2003/0076989 | A1* | 4/2003 | Maayah et al. ............... 382/145 |
| 2005/0210423 | A1 | 9/2005 | Liao et al. |
| 2006/0091321 | A1* | 5/2006 | Kaga .................... G01N 23/225 250/491.1 |
| 2008/0073524 | A1* | 3/2008 | Nishiyama ........... G01N 23/225 250/307 |
| 2009/0050822 | A1* | 2/2009 | Nakasuji et al. .......... 250/492.2 |
| 2009/0058437 | A1 | 3/2009 | Honda et al. |
| 2009/0074286 | A1 | 3/2009 | Kitazawa et al. |
| 2009/0202166 | A1 | 8/2009 | Yamaguchi et al. |
| 2009/0206259 | A1 | 8/2009 | Obara et al. |
| 2011/0098960 | A1 | 4/2011 | Mizuochi |

FOREIGN PATENT DOCUMENTS

| | | |
|---|---|---|
| JP | H 11-251377 A | 9/1999 |
| JP | 2001-176941 | 6/2001 |
| JP | 2001-176941 A | 6/2001 |
| JP | 2003-310927 | 11/2003 |
| JP | 2010-15732 | 1/2010 |
| JP | 2010-015732 | 1/2010 |
| JP | 2010-015732 A | 1/2010 |
| TW | I267899 | 12/2006 |
| TW | I285045 | 8/2007 |

OTHER PUBLICATIONS

PCT International Preliminary Report on Patentability for Application No. PCT/US2011/029543, 5 sheets, dated Nov. 20, 2012 (Nov. 20, 2012).

ROC (Taiwan) Patent Application No. 100112075, 5 sheets, Report issued: Sep. 24, 2013 (Sep. 24, 2013).

* cited by examiner

400

RUN-TIME CORRECTION OF DEFECT LOCATIONS DURING DEFECT REVIEW

BACKGROUND OF THE INVENTION

Field of the Invention

The present invention relates generally to specimen inspection and review systems.

Description of the Background Art

Automated inspection and review systems are important in process control and yield management for the semiconductor and related microelectronics industries. Such systems include electron beam (e-beam) based systems and other types of systems.

As defect locations in a substrate are detected by an inspection tool, the coordinates of these defect locations are stored. Subsequently, a review tool, such as a high-magnification scanning electron microscope (SEM), may be used for more detailed viewing and analysis of the defect locations.

The substrate is aligned on the stage of the review microscope, and a coordinate transformation is established between the review microscope and the defect location coordinates. Thereafter, the transformed coordinates are used by the review tool to find or "re-locate" the defect locations, such that they may be viewed and analyzed in greater detail.

SUMMARY

Figure 1:
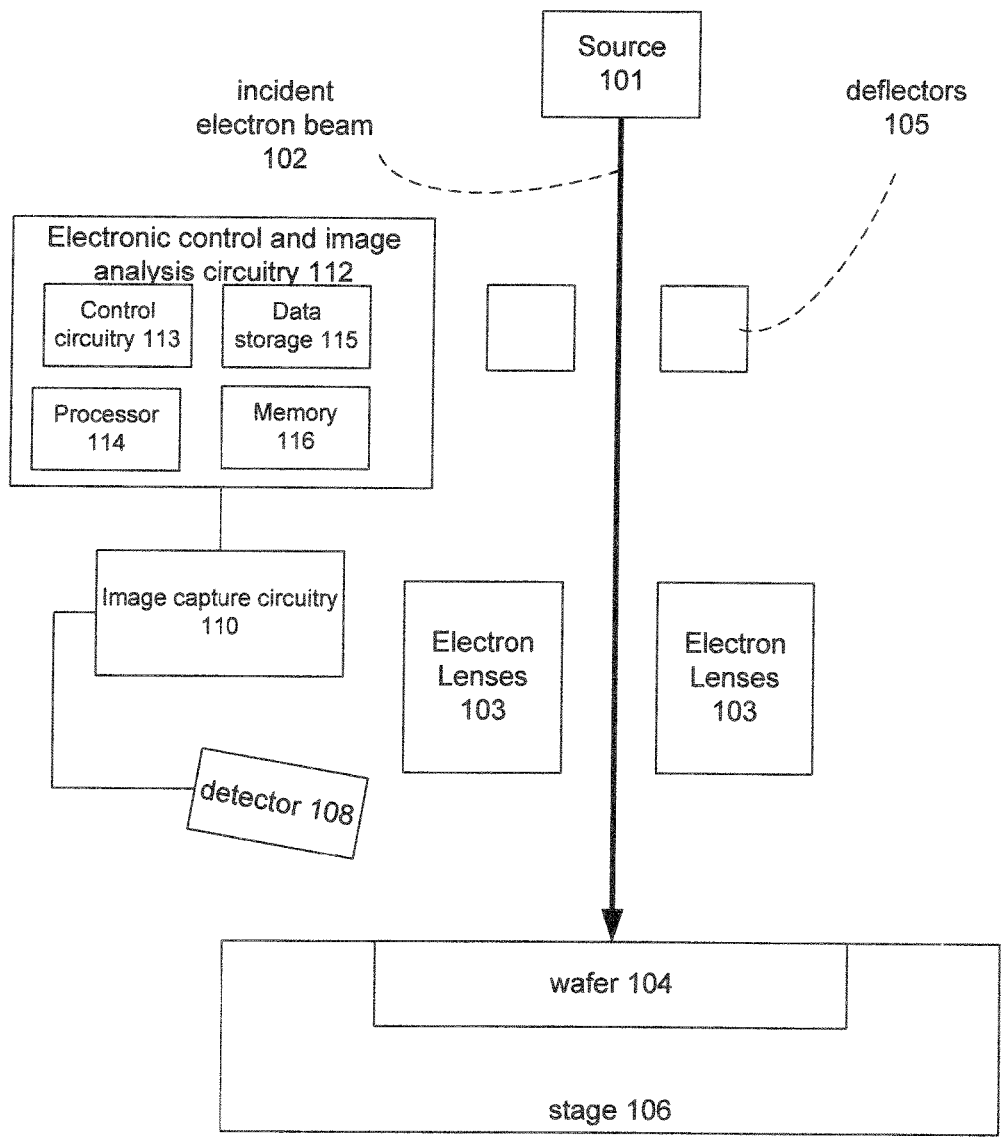
FIG. 1 is a schematic diagram depicting an electron beam apparatus which may be utilized to practice the method disclosed herein in accordance with an embodiment of the invention.

One embodiment relates to a method for run-time correction of defect locations on a substrate during defect review. The substrate is loaded into a stage of a review apparatus, and coordinates for the defect locations on the substrate is received. The defect locations are grouped, and a local reference site in proximity to each group of defect locations is determined. The local reference site is used to determine a positional offset for the defect locations in each group.

Another embodiment relates to an apparatus for reviewing defect locations on a substrate which provides for run-time correction of the defect locations. The apparatus includes a source configured to generate an electron beam, deflectors configured to scan the electron beam over a field of view, electron lenses configured to focus the electron beam onto a surface of a substrate being reviewed, and a detector configured to detect electrons from the substrate. The apparatus further includes electronic control and image analysis circuitry configured to retrieve a list of defect locations on the substrate, determine a local reference site in proximity to each defect location, and use the local reference site to determine a positional offset for the defect location.

Other embodiments and features are also disclosed.

DETAILED DESCRIPTION

In prior inspection and review systems, a coordination transformation is established between the review microscope and the defect coordinates from the inspection system. The substrate is aligned on the stage of the review microscope, and the coordinate transformation is used to re-locate the defects by the review system.

However, applicant has determined that the coordinate transformation used by prior inspection and review systems does not always provide for precise and accurate "re-location" of the defects by the review system. In particular, for fields of view less than one micron, positioning errors frequently result in the actual defect location being outside the field of view of the review system.

The present application discloses methods and apparatus for correcting positioning errors caused by thermal effects and other imperfections of the positioning system of the review scanning electron microscope (SEM). These methods and apparatus are surprisingly efficient, accurate and robust in providing run-time correction of these positioning errors.

The thermal effects that introduce positioning errors may include, for example, heat transfer from the stage to the substrate being reviewed. Such heat transfer may occur over time, such that the positional errors which are induced by the heating are time dependent. The other imperfections may include, for example, minute spatial variations or modulations (waves) in the stage where the wafer is loaded and the positioning is controlled. Such spatial variations or modulations may introduce further positioning errors and complicates the task of re-locating the defects for review.

Applicant has determined that the prior methods involving global translation, scaling and angular corrections cannot correct for positional errors caused by thermal expansion during the defect review after the wafer alignment, nor can they correct for the aforementioned spatial variations or modulations in the stage. Experiments by the applicant have shown that the methods and apparatus disclosed herein advantageously correct such positional errors with submicron precision and accuracy.

FIG. 1 is a schematic diagram depicting an electron beam apparatus which may be utilized to practice the methods disclosed herein in accordance with an embodiment of the invention. The electron beam apparatus comprises, among other components, an electron gun or source 101, condenser lenses (not depicted), beam deflectors 105, electron lenses 103, a detection system 108, image capture circuitry 110, and an image analysis system 112.

In FIG. 1, the electron source 101 generates an incident electron beam 102. One or more electron lens 103 focuses the beam 102 so that it impinges upon a surface of a semiconductor wafer (or other substrate) 104. The wafer 104 is shown as being held in a stage 106. Deflectors 105 may be used to scan the beam 102 over the area being imaged.

A detector 108 for detecting secondary or scattered electrons is also depicted. For example, the stage 106 may be electrically grounded, and a positive voltage may be applied to the detector 108 so as to attract the scattered electrons. Image capture circuitry 110 may be configured with buffers to capture image frames from the detector 108. The image capture circuitry 110 may also be configured to process the image frames, for example, by accumulating or averaging frames.

An electronic control and image analysis circuitry 112 may be configured to control the apparatus so as to obtain, process, and analyze the image data. The electronic control and image analysis circuitry 112 may comprise, for example, apparatus control circuitry 113, one or more processor(s) 114, data storage 115, and memory 116. These various components may be communicatively interconnected (for example, by way of a bus communication system). The electronic control and image analysis circuitry 112 may interface with a display, such as a monitor screen, and user input devices, such as a keyboard and mouse.

In accordance with an embodiment of the invention, the data storage 115 may be configured to store a list of defect locations (detected by an inspection system), SEM image data, and other data, and the memory 116 may be configured with processor-executable code so as to perform various steps of the techniques disclosed in the present application.

Figure 2:
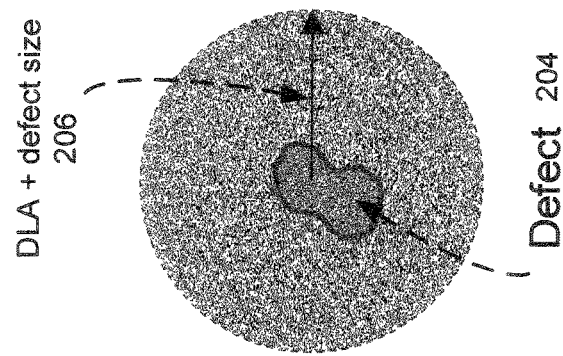
FIG. 2 is a schematic diagram showing an alignment mark on a substrate and a defect located by an inspection system.
Figure 2:
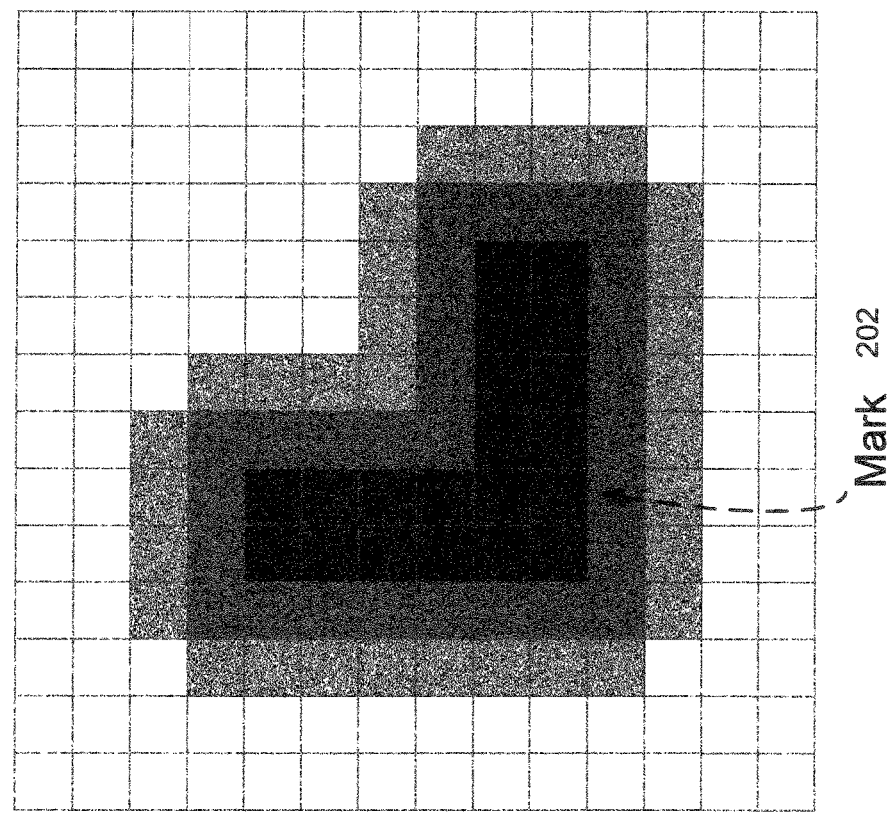

FIG. 2 is a schematic diagram showing an alignment mark 202 on a substrate and a defect 204 located by an inspection system. The alignment mark 202 is shown on a grid where each square represents a size of a pixel of the review imaging system. As seen, the alignment mark 202 may be an L-shaped mark which has a line width of about two pixels. The defect 204 is depicted within a circle which has a radius given by the defect location accuracy (DLA) size plus the defect size. The DLA size represents the defect location accuracy caused by the imperfections of the position system of the inspection or review tools.

Figure 3:
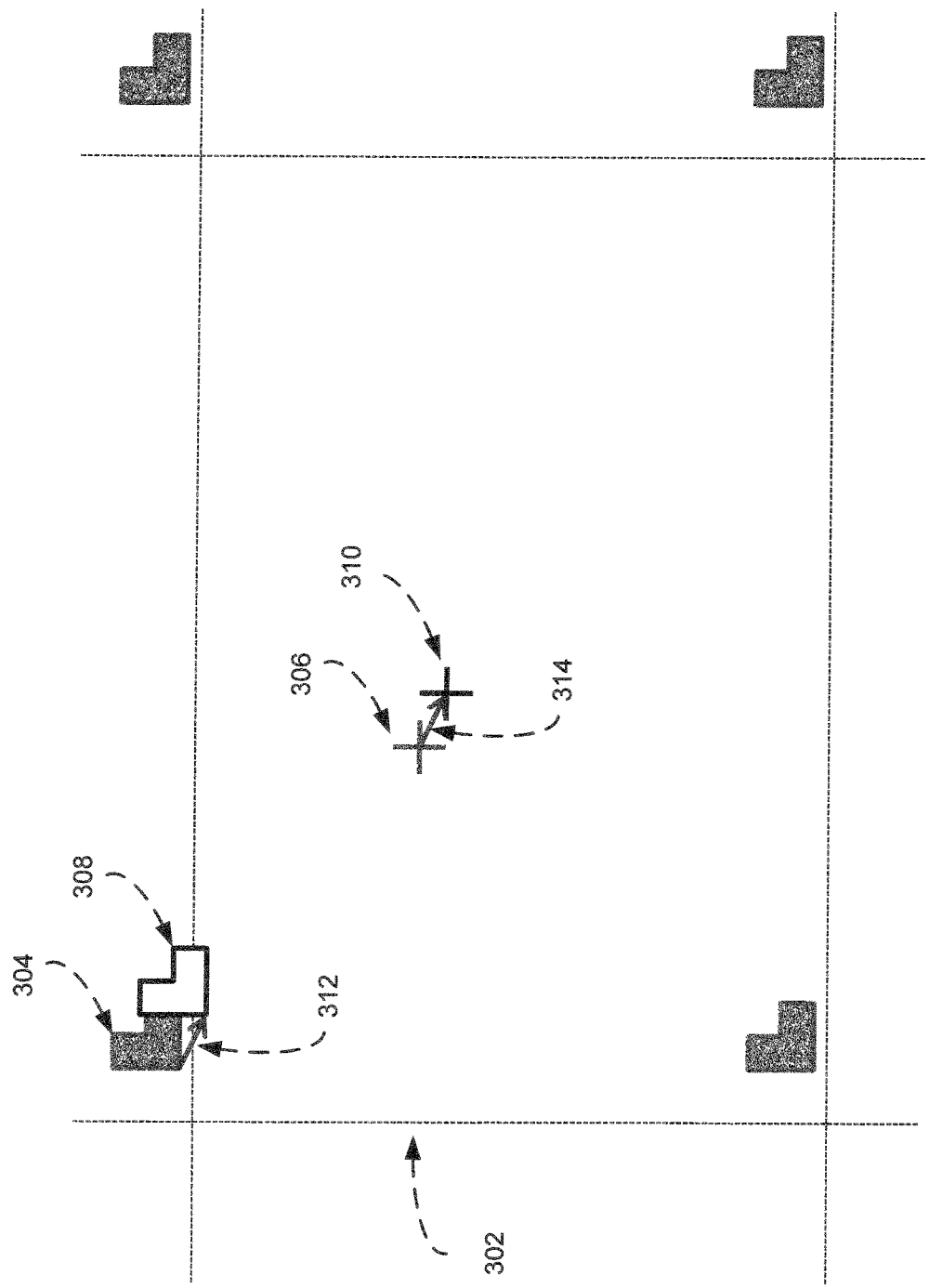
FIG. 3 is a schematic diagram illustrating a shift in position of a defect location between inspection and review in accordance with an embodiment of the invention.

FIG. 3 is a schematic diagram illustrating a shift in position of a defect location between inspection and review in accordance with an embodiment of the invention. In FIG. 3, the dotted lines 302 represent the die grids printed on the wafer. The filled (shaded) L-shaped marks 304 are patterns or alignment marks that repeat periodically on the wafer or reticle. The lighter cross symbol 306 represents the defect location reported by the inspection system.

During review run-time, however, the actual defect location shifts due to a thermal effect and other imperfections in the position system. The thermal effect may be due to heat transfer between the stage and the substrate and so may be time dependent.

An example of the shifted position of an L-shaped mark is shown by the unfilled (white) L-shaped mark 308, and the corresponding shifted position of the defect is shown by the darker cross symbol 310. A first arrow 312 shows a first position change vector for the L-shaped mark, and the second arrow 314 shows a second position change vector for the defect.

Note that the change vectors at different positions on a substrate may generally be different from each other. This is due to the thermal effect effectively expanding (or contracting) the substrate. Such an expansion (or contraction) results in position changes that depend on the location on the substrate. However, in accordance with an embodiment of the invention, by grouping defects by their proximity to alignment marks, the change vectors of defects within the group at run time may be effectively approximated by the change vector of the local (i.e. closest) alignment mark at run time.

Figure 4:
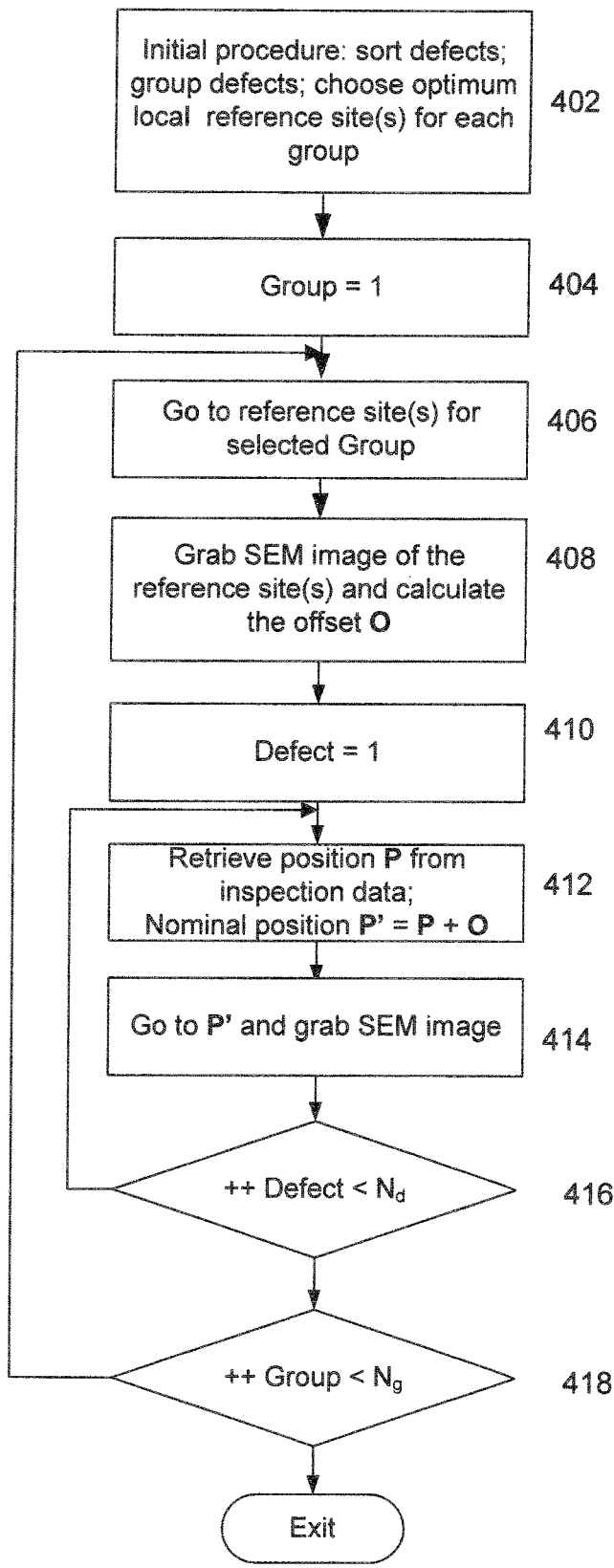
FIG. 4 is a flow chart of a process for run-time correction of a defect location during defect review in accordance with an embodiment of the invention.

FIG. 4 is a flow chart of a process 400 for run-time correction of a defect location during defect review in accordance with an embodiment of the invention. This process 400 may be performed after an inspection system detects defects in a substrate. The inspection system generally reports locations of the detected defects relative to predetermined alignment marks at reference sites on the substrate.

Per block 402, an initial procedure may be performed. This initial procedure may include sorting and then grouping the defects. For example, the defects may be sorted and grouped by their locations on the substrate so as to provide for efficient review of the defects by the review system. For example, the sorting and grouping of defects may provide a sequence of groups, and sequence of defects within each group, which may be imaged in an efficient procedure. For example, the sequences may be determined so as to minimize the time required to move the field of view of the review system to the various defect locations. In addition, an optimum reference site may be chosen for each group. For example, the reference site chosen may correspond to an alignment mark which is closest proximity-wise to the locations (or average location) of the defects in the group.

Per block 404, a first group (for example, having a group number of one) may be selected. In this implementation, the defects in this first group are imaged first (see blocks 406 through 416). Thereafter, the group number may be incremented 418 so as to select a next group and image the defects in that group, until the last group is selected. In this implementation, the last group may have group number $N_g$.

For each selected group, the steps shown in blocks 406 through 416 may be performed. Per block 406, the scanning electron microscopes (SEM) apparatus of the review system may illuminate (with electrons) and focus within its field of view ("go to") a reference site (or multiple reference sites in sequence) for the selected group. For example, in the illustration of FIG. 3, the imaging apparatus may illuminate and focus on the alignment mark 304 which may be the closest in proximity to the defects in the selected group. (If multiple reference sites are used for the selected group, then multiple such alignment marks may be illuminated and focused sequentially.) In one implementation, a relatively large initial field of view may be utilized to roughly locate the run-time position of the alignment mark. Subsequently, a smaller field of view may be utilized for greater precision in locating the mark.

Per block 408, the imaging apparatus of the review system obtains and stores ("grabs") the run-time SEM image of the reference site(s) for the group. This run-time image during review is then analyzed to calculate a measure of the shift or offset of the alignment mark(s) at the reference site. In other words, the location of the alignment mark(s) in the run-time image may be determined, and the two-dimensional offset vector O between the run-time location(s) and the location(s) from the inspection data may be determined. For example, the position shift of the alignment pattern may be obtained by comparing the image data of the pattern acquired by the review system during run-time against the image data from the inspection system. The offset vector O may be referred to as the local offset error for the group of defects under review. In the case where multiple references sites are used, the offset vector O may be a mean or median vector of the shift or offset of the alignment marks at the reference sites.

In this implementation, the number of defects in a selected group is denoted by $N_d$. Per block 410, a first defect in the selected group (for example, having a defect number of one) may be selected and its location retrieved from the stored inspection data. Let P represent the vector or two-dimensional location of the selected defect from the inspection data.

Per block 412, a nominal or approximate two-dimensional (or vector) position P' is calculated for the selected defect under review. As indicated, the two-dimensional position P'=P+O. In other words, the nominal position vector P' is calculated by adding the local offset vector O to the two-dimensional location P of the selected defect from the inspection data.

Per block 414, the SEM apparatus of the review system may illuminate (with electrons) and focus within its field of view ("go to") the site on the substrate at the nominal position vector P' and obtain and store ("grab") an SEM image from that site. For example, in the illustration of FIG. 3, the imaging apparatus may go to the location indicated by the darker cross mark 310 and obtain and store an SEM image from that site.

Per block 416, the process 400 may then increment the defect number to select a next defect in the group and loop back to perform blocks 412 and 414 for the selected defect. This may continue until SEM images are obtained for all defects in the selected group.

Per block 418, the process 400 may then increment the group number to select a next group and loop back to block 406. This may continue until all the groups have been processed.

The above-described diagrams are not necessarily to scale and are intended be illustrative and not limiting to a particular implementation. The above-described invention may be used in an automatic inspection and review system and applied to the inspection and review of wafers, optical masks, X-ray masks, electron-beam-proximity masks and stencil masks and similar substrates in a production environment.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for run-time correction of defect locations on a substrate during defect review, the method comprising:
   loading the substrate into a stage of a review apparatus, the review apparatus comprising a source for generating an electron beam, deflectors configured to scan the electron beam over a field of view, electron lenses for focusing the electron beam onto a surface of a substrate being reviewed, a detector for detecting electrons from the substrate, and electronic control and image analysis circuitry;
   receiving coordinates for the defect locations on the substrate as detected by an inspection system;
   sorting and grouping the defect locations by the electronic control and image analysis circuitry so as to provide a sequence of groups of defect locations and a sequence of the defect locations within each group;
   determining at least one local reference site in proximity to each group of defect locations by the electronic control and image analysis circuitry; and
   using the local reference site(s) to determine, by the electronic control and image analysis circuitry, a positional offset for the defect locations in each group by obtaining run-time image data of the local reference site by the review apparatus and calculating the positional offset by comparing the run-time image data against data of the reference site(s) obtained by the inspection system;
   selecting a first group in the sequence of groups;
   imaging the defect locations within the first group in an order specified by the sequence of defect locations within the first group, wherein said imaging obtains run-time image data for each defect location in each group by imaging a field of view located at a corrected position that is the coordinates of the defect location from the inspection system plus the positional offset for the defect locations in the group to which the defect belongs; and
   repeating selection of a next group in the sequence of groups and imaging the defect location within the next group in an order specified by the sequence of defect location within the next group, until there is no further groups to select in the sequence of groups.

2. The method of claim 1, wherein the method is performed by an inspection and review system based on scanning electron microscope apparatus.

3. The method of claim 1, wherein the substrate comprises a patterned semiconductor wafer.

4. The method of claim 1, wherein the run-time image data is obtained from a field of view which is less than a micron in diameter.

5. The method of claim 1, wherein the method corrects for positioning errors with submicron accuracy.

6. An apparatus for reviewing defect locations on a substrate which provides for run-time correction of the defect locations, the apparatus comprising:
   a source configured to generate an electron beam;
   deflectors configured to scan the electron beam over a field of view;
   electron lenses configured to focus the electron beam onto a surface of a substrate being reviewed;
   a detector configured to detect electrons from the substrate; and
   electronic control and image analysis circuitry configured to retrieve a list of defect locations on the substrate, sort and group the defect locations so as to provide a sequence of groups of defect locations and a sequence of the defect locations within each group, determine one or more local reference site in proximity to each defect location, and use the local reference site(s) to determine a positional offset for the defect location by obtaining run-time image data of the local reference site by the review apparatus and calculating the positional offset by comparing the run-time image data against data of the reference site(s) obtained by the inspection system,
   wherein the electronic control and image analysis circuitry performs steps including selecting a first group in the sequence of groups, imaging the defect locations within the first group in an order specified by the sequence of defect locations within the first group, wherein said imaging obtains run-time image data for each defect location in each group by imaging a field of view located at a corrected position that is the coordinates of the defect location from the inspection system plus the positional offset for the defect locations in the group to which the defect belongs, and repeating selection of a next group in the sequence of groups and imaging the defect location within the next group in an order specified by the sequence of defect location within the next group, until there is no further groups to select in the sequence of groups.

7. The apparatus of claim 6, wherein the substrate comprises a patterned semiconductor wafer.

8. The apparatus of claim 6, wherein the run-time image data is obtained from a field of view which is less than a micron in diameter.

* * * * *